United States Patent
Sato

(10) Patent No.: US 7,709,802 B2
(45) Date of Patent: May 4, 2010

(54) RADIATION IMAGE CAPTURING APPARATUS AND METHOD OF PROCESSING IMAGE INFORMATION THEREFOR

(75) Inventor: Masaru Sato, Hiratsuka (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/044,611

(22) Filed: Mar. 7, 2008

(65) Prior Publication Data

US 2008/0217544 A1    Sep. 11, 2008

(30) Foreign Application Priority Data

Mar. 9, 2007    (JP)    ............... 2007-060126

(51) Int. Cl.
*G01T 1/24* (2006.01)

(52) U.S. Cl. ................................. 250/370.08

(58) Field of Classification Search ............ 250/370.01, 250/370.08, 370.09, 370.11, 484.4, 483.1
See application file for complete search history.

(56) References Cited

U.S. PATENT DOCUMENTS 6,515,734 B1 * 2/2003 Yamada et al. ................. 355/54

2003/0030004 A1 * 2/2003 Dixon et al. ........... 250/370.09
2003/0080299 A1 * 5/2003 Moon .................... 250/370.09
2008/0080667 A1 * 4/2008 Kashiwagi ................... 378/37

FOREIGN PATENT DOCUMENTS

JP            59022046 A  *  2/1984
JP            2002-199388 A    7/2002

* cited by examiner

*Primary Examiner*—David P Porta
*Assistant Examiner*—Faye Boosalis
(74) *Attorney, Agent, or Firm*—Sughrue Mion, PLLC

(57) ABSTRACT

A radiation detector includes two radiation conversion panels for detecting radiation image information representing a radiation image of a subject. A signal combination judging circuit judges a combination of two serial signals representing the detected radiation image information. Based on the judged combination, an amplitude/phase modulator modulates the serial signal into an amplitude-modulated signal and modulates the phase of the amplitude-modulated signal according to the other serial signal, generating an amplitude/phase-modulated signal. The amplitude/phase-modulated signal is transmitted through an optical fiber to a console.

15 Claims, 14 Drawing Sheets

RADIATION IMAGE CAPTURING APPARATUS AND METHOD OF PROCESSING IMAGE INFORMATION THEREFOR

BACKGROUND OF THE INVENTION

1. Field of the Invention

The present invention relates to a radiation image capturing apparatus, which includes a radiation detector comprising a two-dimensional matrix of radiation detecting elements, for capturing a radiation image of a subject by applying a radiation emitted from a radiation source through the subject to the radiation detector, and a method of processing radiation image information captured by the radiation image capturing apparatus.

2. Description of the Related Art

Heretofore, there have widely been used radiation image capturing apparatus for applying a radiation to a subject and guiding the radiation that has passed through the subject to a radiation conversion panel for thereby recording radiation image information of the subject on the radiation conversion panel. The radiation conversion panel comprises, for example, a stimulable phosphor panel which is capable of storing a radiation energy representing radiation image information in a phosphor and subsequently emitting the stored radiation energy representing radiation image information as stimulated light from the phosphor by applying stimulating light to the phosphor.

In recent years, the medical field has faced demands for a system for recording radiation image information on a radiation conversion panel and thereafter immediately reading the recorded radiation image information for diagnosis or the like. To meet such demands, it has been proposed to use, instead of the stimulable phosphor panel, a semiconductor sensor employing a CCD solid-state sensor or amorphous silicon for directly converting the applied radiation into an electric signal to be read.

Efforts have been made to produce radiation conversion panels which are higher in resolution (with more pixels) and larger in area. Therefore, it is important to develop a technology for transmitting a large amount of radiation image information recorded in radiation conversion panels at a high rate to diagnostic systems or the like.

Japanese laid-open patent publication No. 2002-199388 discloses a radiation image capturing apparatus for transmitting radiation image information at a high rate through optical fibers. FIG. 13 of the accompanying drawings shows a schematic arrangement of such a radiation image capturing apparatus 2.

As shown in FIG. 13, the radiation image capturing apparatus 2 comprises an image capturing unit 4 for capturing radiation image information and a controller 6 for controlling the image capturing unit 4 and processing the radiation image information sent from the image capturing unit 4. In the image capturing unit 4, the radiation image information is recorded on a radiation conversion panel 8 which may comprise a semiconductor sensor or the like. The radiation conversion panel 8 is divided into two areas A, B which record respective items of radiation image information. When the respective items of recorded radiation image information are read from the areas A, B of the radiation conversion panel 8, they are converted into respective digital signals by A/D converters 10a, 10b. The digital signals from the A/D converters 10a, 10b are multiplexed by a multiplexer 12. The multiplexed digital signals are converted into a serial signal by a parallel-to-serial converter 14. The serial signal from the parallel-to-serial converter 14 converted by an electro-optical transducer 16 into an optical signal, which is transmitted through an optical fiber 18 to the controller 6. In the controller 6, the optical signal is converted by an optoelectrical transducer 20 into an electric signal, which is converted into a parallel signal by a serial-to-parallel converter 22. The parallel signal from the serial-to-parallel converter 22 is supplied to a CPU 24. The CPU 24 processes the parallel signal to rearrange the items of radiation image information from the areas A, B to reproduce an image from the radiation image information.

FIG. 14 of the of the accompanying drawings is a diagram showing the relationship between the serial signal supplied from the parallel-to-serial converter 14 to the electro-optical transducer 16 and the optical signal transmitted from the electro-optical transducer 16 through the optical fiber 18 to the controller 6.

As shown in FIG. 14, the serial signal comprises a series of data $SA_k, SA_{k+1}, SA_{k+2}, \ldots$ representing the radiation image information read from the area A of the radiation conversion panel 8, and a series of data $SB_k, SB_{k+1}, BA_{k+2}, \ldots$ representing the radiation image information read from the area B of the radiation conversion panel 8. The serial signal is supplied from the parallel-to-serial converter 14 to the electro-optical transducer 16, which converts the serial signal into an amplitude-modulated optical signal. The amplitude-modulated optical signal comprises high and low amplitude levels which represent levels "1" and "0" of the data of the serial signal.

Even though the optical fiber 18 is used to transmit the optical signal from the image capturing unit 4 to the controller 6, since the amount of data to be transmitted remains unchanged, there is a certain limitation on high-rate transmission of the signal.

SUMMARY OF THE INVENTION

It is a general object of the present invention to provide a radiation image capturing apparatus which is capable of efficiently and wastelessly transmitting a large amount of radiation image information that has been detected by a radiation detector, and a method of processing radiation image information captured by the radiation image capturing apparatus.

A major object of the present invention to provide a radiation image capturing apparatus which is capable of increasing a transmission rate for radiation image information by reducing the amount of radiation image information to be transmitted, and a method of processing radiation image information captured by the radiation image capturing apparatus.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
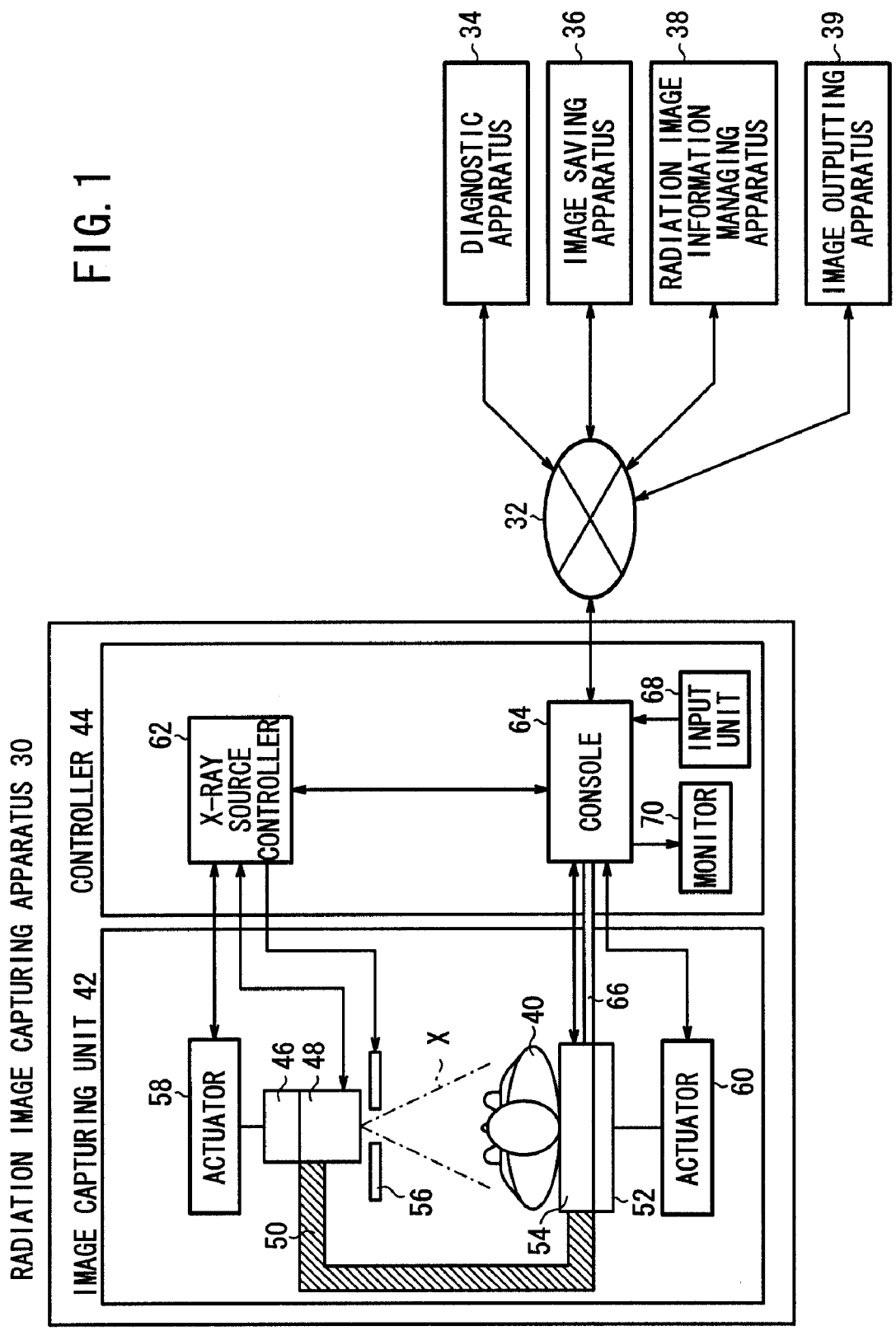
FIG. 1 is a block diagram of a medical support system incorporating a radiation image capturing apparatus and a method of processing radiation image information captured by the radiation image capturing apparatus according to an embodiment of the present invention.

FIG. 1 shows a medical support system constructed in the radiological department of a hospital, for example, which incorporates a radiation image capturing apparatus and a method of processing radiation image information captured by the radiation image capturing apparatus according to an embodiment of the present invention.

The medical support system comprises a radiation image capturing apparatus 30 according to the embodiment of the present invention which is installed in the radiological department, a diagnostic apparatus 34 for receiving radiation image information from the radiation image capturing apparatus 30 through an in-house network 32 and diagnosing the received radiation image information, an image saving apparatus 36 connected to the in-house network 32 for saving the radiation image information, a radiation image information managing apparatus 38 for managing the radiation image information, and an image outputting apparatus 39 for making a printout of the radiation image. A plurality of other modalities for acquiring radiation image information may be connected to the in-house network 32.

The radiation image capturing apparatus 30 comprises an image capturing unit 42 for capturing radiation image information of a subject 40 by applying a radiation X thereto and a controller 44 for controlling the image capturing unit 42.

The image capturing unit 42 comprises a radiation source 48 for emitting the radiation X, the radiation source 48 being integrally combined with a cooling unit 46, and a radiation detector 54 for detecting the radiation X that has passed through the subject 40. The radiation detector 54 is connected to the radiation source 48 by an arm 50 and integrally combined with a cooling unit 52. The radiation detector 54 also functions as an image capturing bed for positioning the subject 40 thereon. A collimator 56 for adjusting a range in which the radiation X is applied to the subject 40 is mounted on the radiation source 48.

Figure 2:
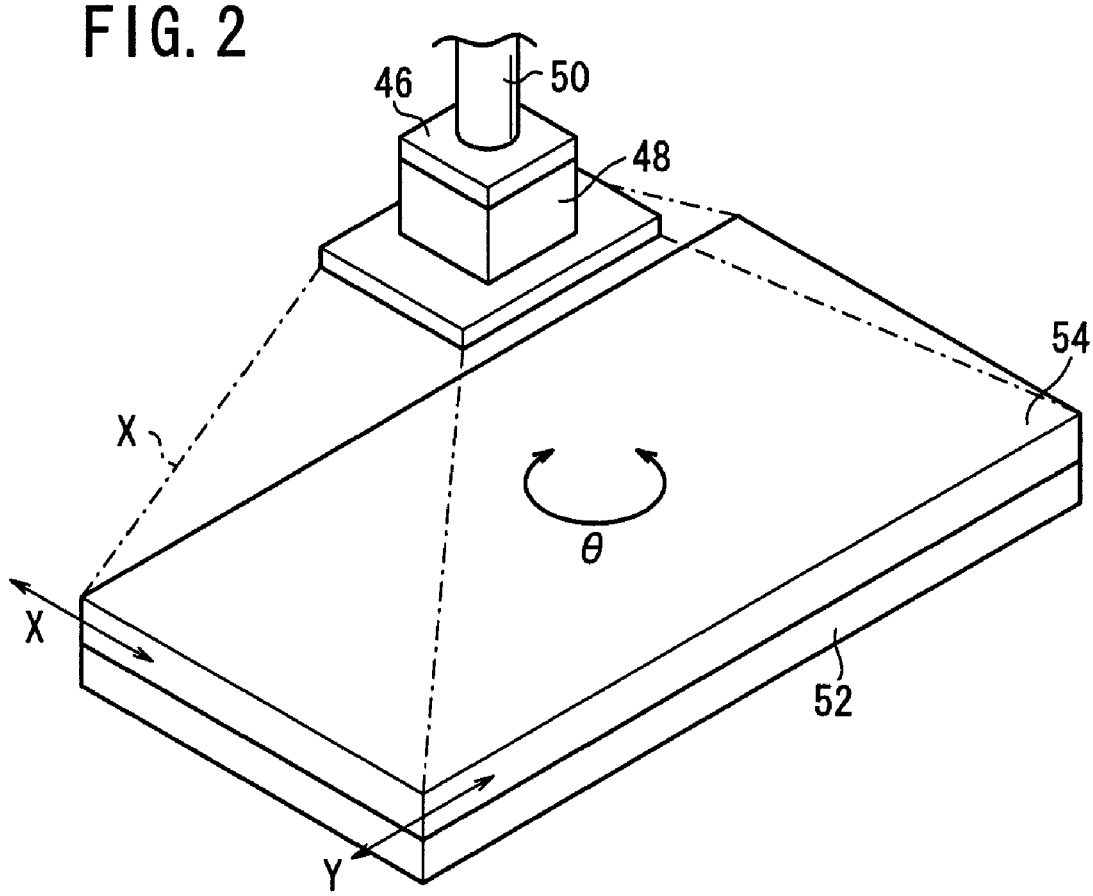
FIG. 2 is a perspective view showing directions in which a component of an image capturing unit of the radiation image capturing apparatus shown in FIG. 1 are actuated.

The radiation source 48 and the radiation detector 54 can be positionally adjusted by a pair of actuators 58, 60 for setting the subject 40 to any desired postures for capturing images of the subject 40. As shown in FIG. 2, the radiation detector 54 can be positionally adjusted in the directions indicated by the arrows X, Y, θ by the actuator 60 (adjuster) for setting its own position and posture with respect to the radiation source 48.

The controller 44 comprises an X-ray source controller 62 for controlling the radiation source 48, controlling the actuator 58 to adjust the positions of the radiation source 48 and the radiation detector 54, and controlling the collimator 56 to adjust the range in which the radiation X is applied, and a console 64 (generating range setting unit) for controlling the radiation detector 54 to acquire recorded radiation image information therefrom, and controlling the actuator 60 to adjust the position and posture of the radiation detector 54. The radiation detector 54 and the console 64 are connected to each other by an optical fiber 66 for transmitting radiation image information at a high rate from the radiation detector 54 to the console 64. To the console 64, there are connected an input unit 68 for receiving inputs from a radiological technician who operates the radiation image capturing apparatus 30, and a monitor 70 for displaying various items of information.

Figure 3:
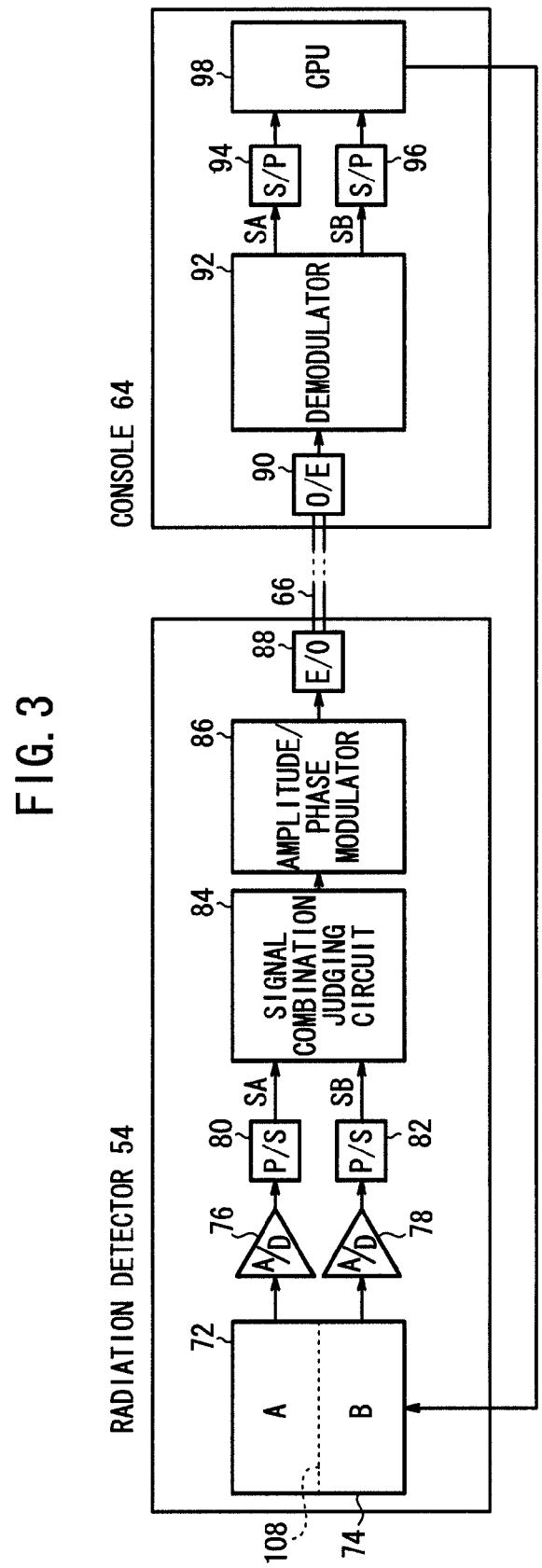
FIG. 3 is a block diagram of a radiation detector and a processing circuit of a console of the radiation image capturing apparatus shown in FIG. 1.

FIG. 3 shows in block form the radiation detector 54 and a processing circuit of the console 64.

As shown in FIG. 3, the radiation detector 54 comprises two radiation conversion panels 72, 74 (detection panels) having respective two-dimensional matrixes of photoelectric transducers and integrally coupled to each other. Use of the two radiation conversion panels 72, 74 makes it possible to provide the radiation detector 54 with wide detecting areas inexpensively. Alternatively, the radiation detector 54 may comprise a single radiation conversion panel divided into two detecting areas.

Respective items of radiation image information detected by the radiation conversion panels 72, 74 are converted by A/D converters 76, 78 into respective digital signals, which are converted into respective serial signals SA, SB by parallel-to-serial converters 80, 82. A signal combination judging circuit 84 judges, bit by bit, a combination of the serial signal SA which is detected in the detecting area A of the radiation conversion panel 72 and the serial signal SB which is detected in the detecting area B of the radiation conversion panel 72, and outputs the judged result to an amplitude/phase modulator 86.

Since each bit of the serial signals SA, SB is represented by 1 or 0, the serial signals SA, SB exist in any one of four combinations at a time. Based on the judged one of the four combinations, the amplitude/phase modulator 86 combines and modulates the serial signals SA, SE into an amplitude/phase-modulated signal, i.e., a signal which has been modulated in terms of both amplitude and phase.

Figure 4:
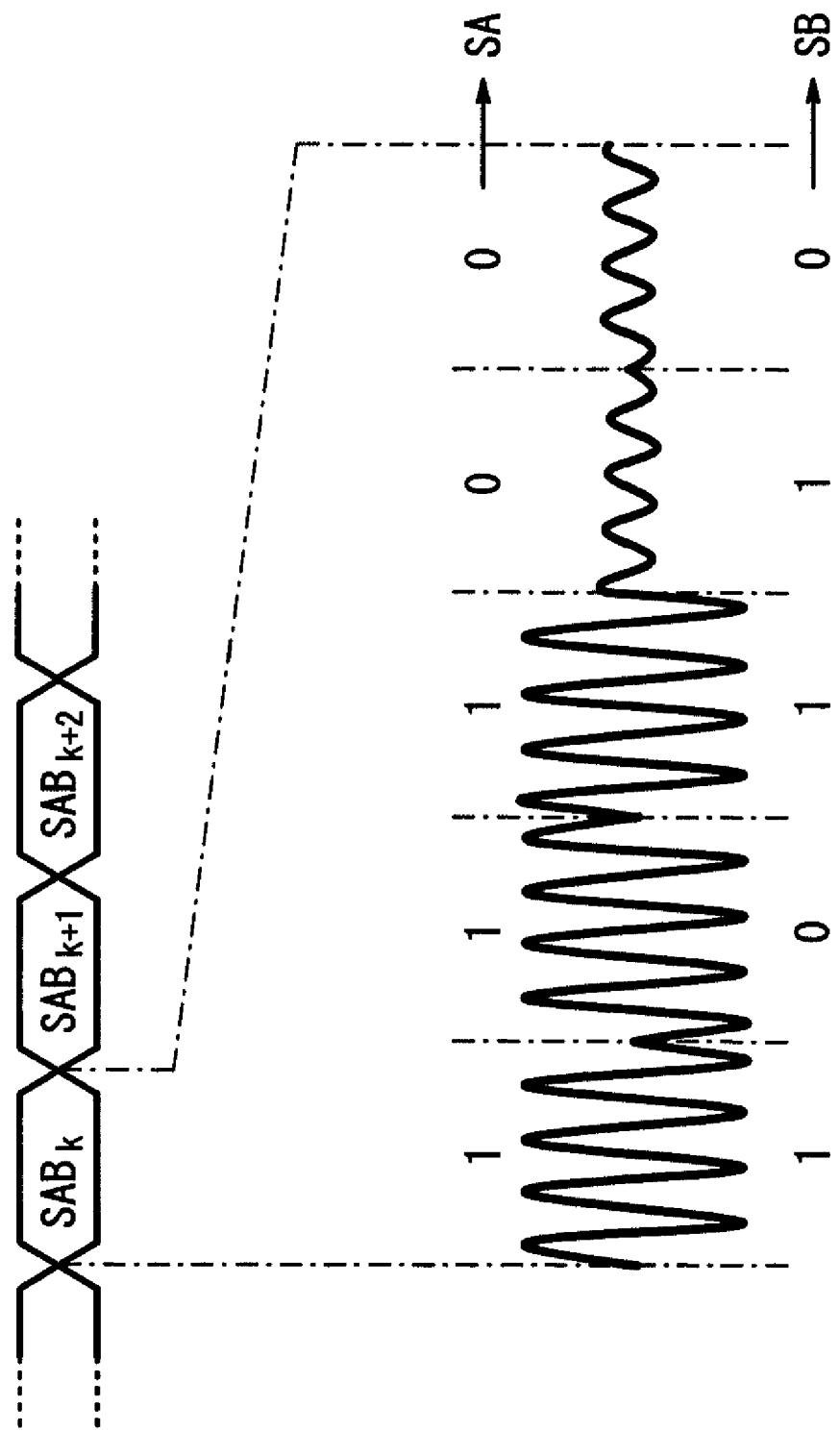
FIG. 4 is a diagram showing an amplitude/phase-modulated signal generated by an amplitude/phase modulator of the radiation detector shown in FIG. 3.

FIG. 4 shows a combined signal comprising data $SAB_k$, $SAB_{k+1}$, $SAB_{k+2}$, ... representing a combination of the serial signals SA, SB, and an amplitude/phase-modulated signal generated by the amplitude/phase modulator 86 based on the combined signal. When the data $SAB_k$ of the combined signal represents the level 1 of the serial signal SA and the level 1 of the serial signal SB, the amplitude/phase modulator 86 converts the serial signal SA into an amplitude-modulated signal having a high amplitude and converts the amplitude-modulated signal into an amplitude/phase-modulated signal starting from the phase 0 representative of the serial signal SB. When the data $SAB_k$ of the combined signal represents the level 1 of the serial signal SA and the level 0 of the serial signal SB, the amplitude/phase modulator 86 converts the amplitude-modulated signal into an amplitude/phase-modulated signal starting from the phase π representative of the serial signal SB. When the data $SAB_k$ of the combined signal represents the level 0 of the serial signal SA and the level 1 of the serial signal SB, the amplitude/phase modulator 86 converts the serial signal SA into an amplitude-modulated signal having a low amplitude and converts the amplitude-modulated signal into an amplitude/phase-modulated signal starting from the phase 0 representative of the serial signal SB. When the data $SAB_k$ of the combined signal represents the level 0 of the serial signal SA and the level 0 of the serial signal SB, the amplitude/phase modulator 86 converts the amplitude-modulated signal into an amplitude/phase-modulated signal starting from the phase $\pi$ representative of the serial signal SB. The phase representative of the serial signal SB may be any values other than 0, $\pi$ insofar as they can distinguish between the level 1 of the serial signal SB and the level 0 of the serial signal SB.

The amplitude/phase-modulated signal generated by the amplitude/phase modulator 86 is converted by an electro-optical transducer 88 into an optical signal, which is transmitted through the optical fiber 66 to an optoelectrical transducer 90 of the console 64. The console 64 includes a demodulator 92 for demodulating an amplitude/phase-modulated signal converted by the optoelectrical transducer 90 into the serial signals SA, SB, serial-to-parallel converters 94, 96 for converting the serial signals SA, SB into parallel signals, and a CPU 98 for processing the parallel signals to rearrange the items of radiation image information from the detecting areas A, B to reproduce an image from the radiation image information, and exchanging data with an external apparatus through the in-house network 32.

Figure 5:
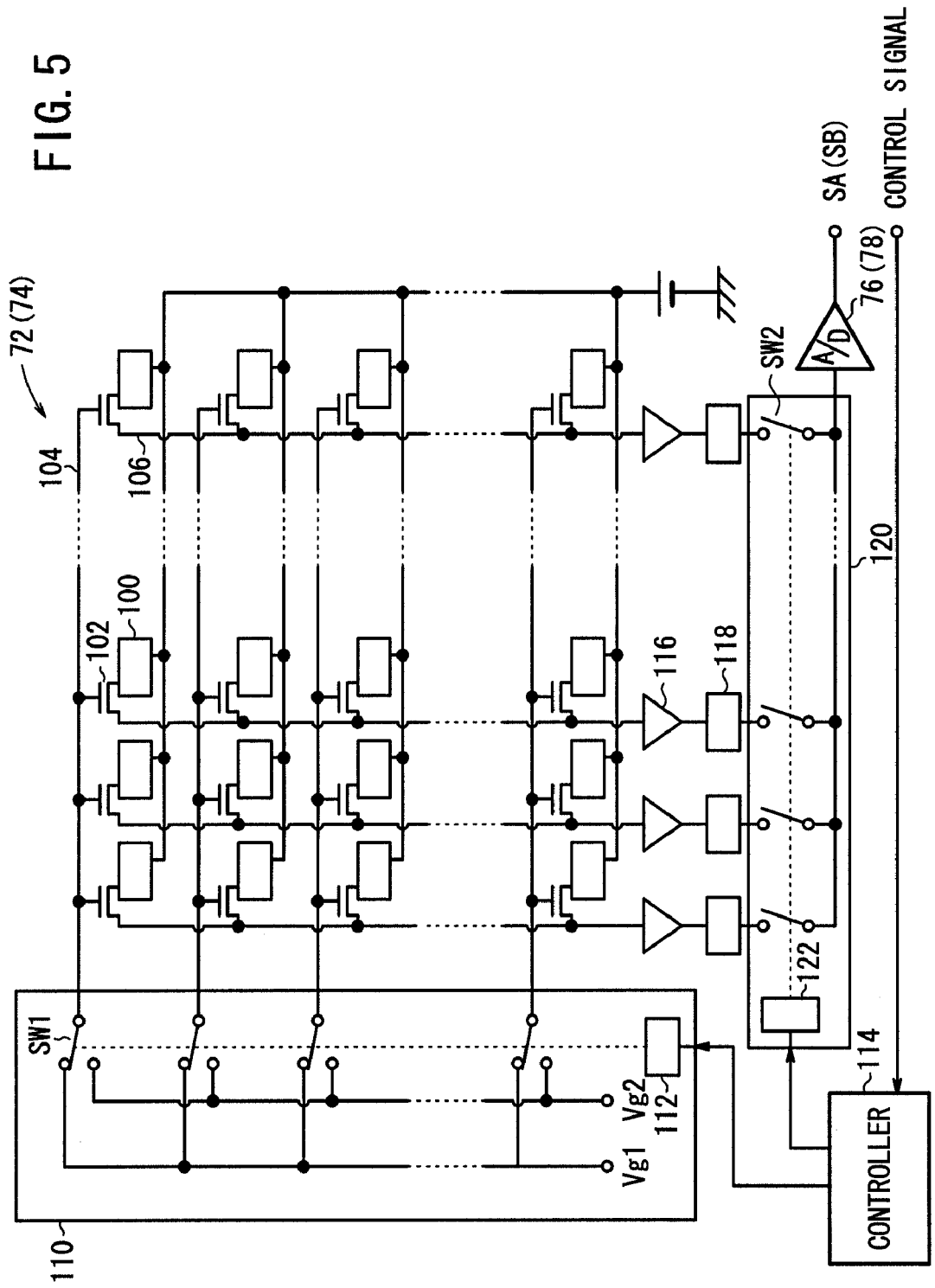
FIG. 5 is a circuit diagram, partly in block form, of a circuit arrangement of radiation conversion panels of the radiation detector shown in FIG. 3.

FIG. 5 shows a circuit arrangement of the radiation conversion panels 72, 74. Each of the radiation conversion panels 72, 74 comprises a two-dimensional matrix of photoelectric transducers 100 (radiation detecting elements). Each of the photoelectric transducers 100 may be made of a radiation-sensitive material, such as amorphous selenium (a-Se), for example, for generating carriers when irradiated with the radiation X. Since amorphous selenium changes its structure at high temperatures, the radiation conversion panels 72, 74 are cooled to a desired temperature by the cooling unit 52. Each of the radiation conversion panels 72, 74 also includes gate lines 104 and signal lines 106 which are connected to the photoelectric transducers 100 by respective TFT transfer elements 102. The gate lines 104 are supplied from a line scanning driver 110 with control signals for turning on and off the transfer elements 102 connected to the photoelectric transducers 100 which are arrayed in rows parallel to a joint line 108 between the radiation conversion panels 72, 74. The line scanning driver 110 comprises a plurality of switches SW1 for switching the gate lines 104 and an address decoder 112 for outputting a selection signal for selecting one of the switches SW1 at a time. The address decoder 112 is supplied with an address signal from a controller 114.

The signal lines 106 are connected to respective amplifiers 116 for amplifying radiation image information signals supplied through the transfer elements 102 from the respective columns of photoelectric transducers 100 which are arrayed along a direction perpendicular to the joint line 108. The amplifiers 116 are connected through respective sample-and-hold circuits 118 to a multiplexer 120. The multiplexer 120 comprises a plurality of switches SW2 for switching the signal lines 106 and an address decoder 122 for selecting one of the switches SW2 at a time. The switches SW2 are connected to A/D converters 76, 78. The address decoder 122 is supplied with an address signal from the controller 114. The controller 114 supplies the address signals for selecting the transfer elements 102 to the address decoders 112, 122 based on a control signal supplied from the CPU 98 of the console 64.

The medical support system is basically constructed as described above. Operation of the medical support system will be described below.

After having positioned the subject 40 in a predetermined position on the radiation detector 54 of the radiation image capturing apparatus 30, the radiological technician sets image capturing conditions in the X-ray source controller 62 through the input unit 68 connected to the console 64, and controls the actuators 58, 60 to adjust the positions and/or postures of the radiation source 48 and the radiation detector 54. The radiological technician moves the collimator 56 to adjust the range in which the radiation X is applied to the subject 40. After the above preparatory process is completed, the X-ray source controller 62 controls the radiation source 48 to apply the radiation X to the subject 40 to capture radiation image information thereof.

The radiation X that has passed through the subject 40 is applied to the photoelectric transducers 100 of the radiation conversion panels 72, 74, which convert the radiation X into radiation image information represented by electric signals. The radiation image information stored in the photoelectric transducers 100 is read according to address signals supplied from the controller 114 to the line scanning driver 110 and the multiplexer 120.

Specifically, the address decoder 112 of the line scanning driver 110 outputs a selection signal to select one of the switches SW1 according to an address signal supplied from the controller 114, supplying a control signal, e.g., a control signal Vg2, to the gates of the transfer elements 102 which are connected to the gate line 104 corresponding to the selected switch SW1. The address decoder 122 of the multiplexer 120 outputs a selection signal to successively select the switches SW2 according to an address signal supplied from the controller 114, reading radiation image information signals which represent the radiation image information stored in the photoelectric transducers 100 which are connected to the gate line 104 selected by the line scanning driver 110.

The radiation image information signals read from the photoelectric transducers 100 which are connected to the selected gate lines 104 of the radiation conversion panels 72, 74 are amplified by the amplifiers 116. The amplified radiation image information signals are sampled by the respective sample-and-hold circuits 118, and supplied through the multiplexer 120 to the A/D converters 76, 78, which convert the radiation image information signals into digital signals. The digital signals are converted from parallel signals into serial signals SA, SB by the parallel-to-serial converters 80, 82. The serial signals SA, SB are supplied to the signal combination judging circuit 84.

The signal combination judging circuit 84 judges, bit by bit, a combination of the serial signal SA which is read from the detecting area A of the radiation conversion panel 72 and the serial signal SB which is read from the detecting area B of the radiation conversion panel 72, and outputs the judged result to the amplitude/phase modulator 86. The judged result represents either one of four combinations of the levels of the serial signals SA, SB, i.e., the level 1 of the serial signal SA and the level 1 of the serial signal SB, the level 1 of the serial signal SA and the level 0 of the serial signal SB, the level 0 of the serial signal SA and the level 1 of the serial signal SB, and the level 0 of the serial signal SA and the level 0 of the serial signal SB.

Based on the judged result, the amplitude/phase modulator 86 modulates the serial signals SA, SB into an amplitude/ phase-modulated signal, i.e., a signal which has been modulated in terms of both amplitude and phase, as shown in FIG. 4, and supplies the amplitude/phase-modulated signal to the electro-optical transducer 88. The amplitude/phase-modulated signal has an amount of data which is one-half of the radiation image information signal because the serial signals SA, SB are combined with each other as described above.

The electro-optical transducer 88 converts the supplied amplitude/phase-modulated signal into an optical signal, which is transmitted at a high rate through the optical fiber 66 to the optoelectrical transducer 90 of the console 64. The optoelectrical transducer 90 converts the supplied optical signal into an amplitude/phase-modulated signal, which is demodulated into the serial signals SA, SB by the demodulator 92. The demodulated serial signals SA, SB are converted by the serial-to-parallel converters 94, 96 into parallel signals, which are supplied to the CPU 98.

Similarly, the gate lines 104 of the radiation conversion panels 72, 74 are successively selected, and the read radiation image information signals are converted into amplitude/phase-modulated signals, which are transmitted from the radiation detector 54 to the console 64. The amplitude/phase-modulated signals are demodulated by the demodulator 92 into the serial signals SA, SB that are supplied to the CPU 98. The CPU 98 processes the signals to rearrange the items of radiation image information from the detecting areas A, B to reproduce an image from the radiation image information. The reproduced image is displayed on the monitor 70 for confirmation of its radiation image information by the radiological technician.

The confirmed radiation image information is supplied through the in-house network 32 to the diagnostic apparatus 34 for diagnosis by the doctor, and is also saved in the image saving apparatus 36.

Figure 6:
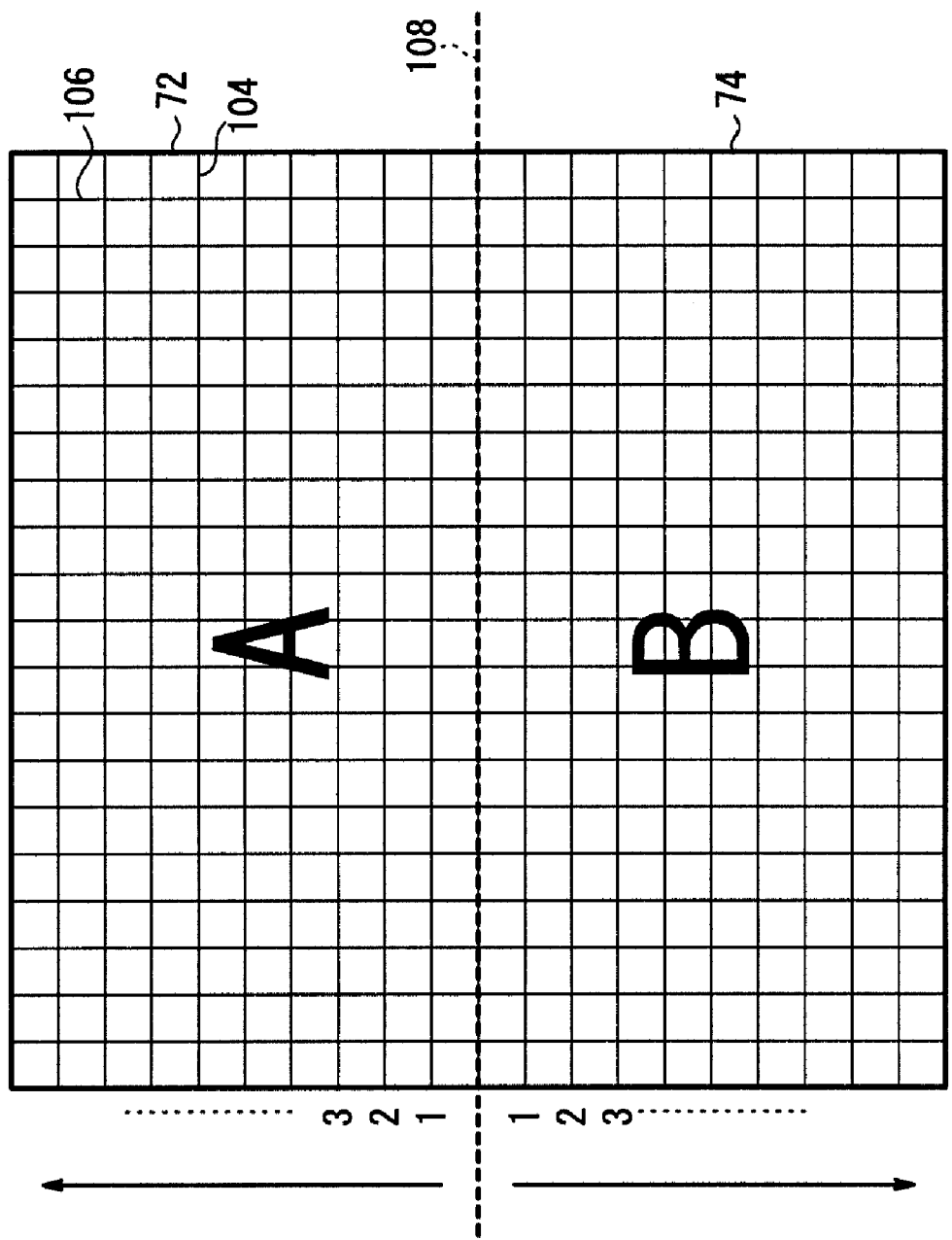
FIG. 6 is a view showing the layout of gate lines and signal lines of the radiation conversion panel.

As shown in FIG. 6, in the radiation conversion panels 72, 74, the rows of the photoelectric transducers 100 connected to the common gate lines 104 extend parallel to the joint line 108 (see FIG. 5). For reading the radiation image information from the two radiation conversion panels 72, 74, the address signal supplied to the address decoder 112 of the line scanning driver 110 may be set to read the radiation image information successively from the rows 1, 2, 3, . . . of the photoelectric transducers 100, starting from the joint line 108, along the directions indicated by the arrows. In this manner, only required radiation image information may be efficiently read from the radiation conversion panels 72, 74.

Figure 7:
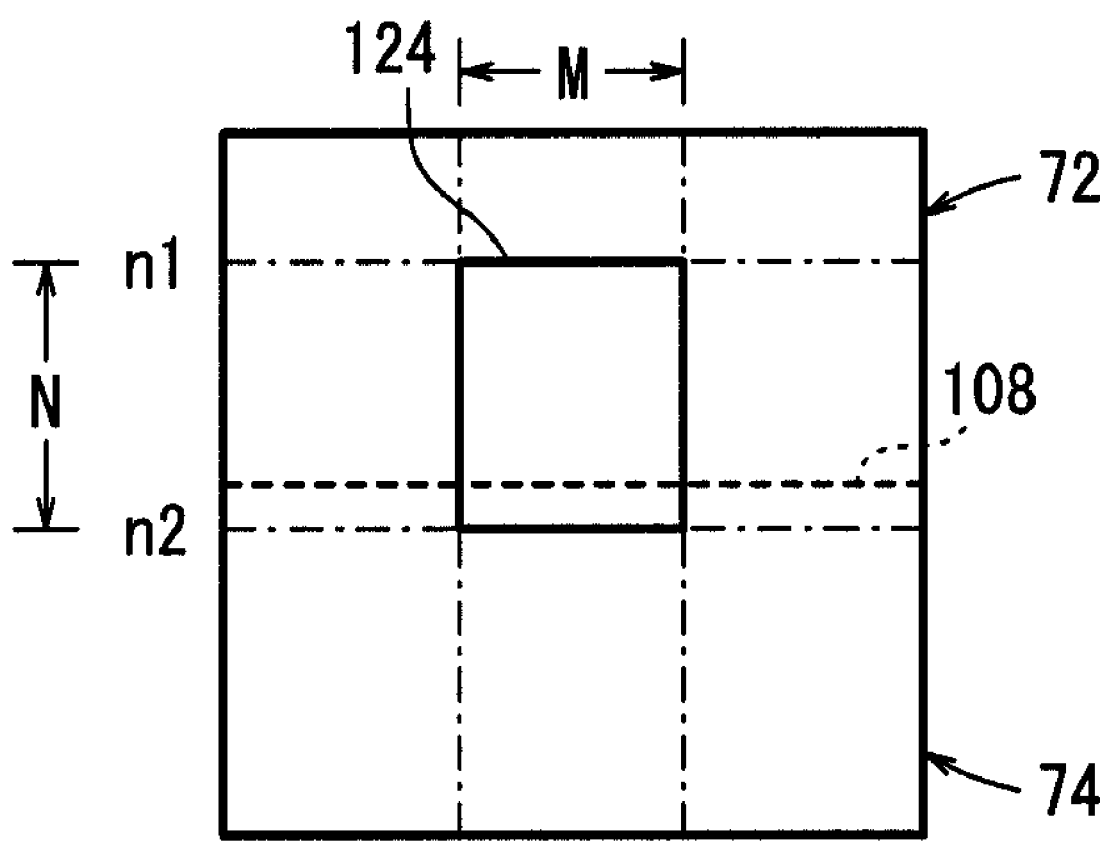
FIG. 7 is a view showing the relationship between the radiation conversion panel and a radiation applied range.
Figure 8:
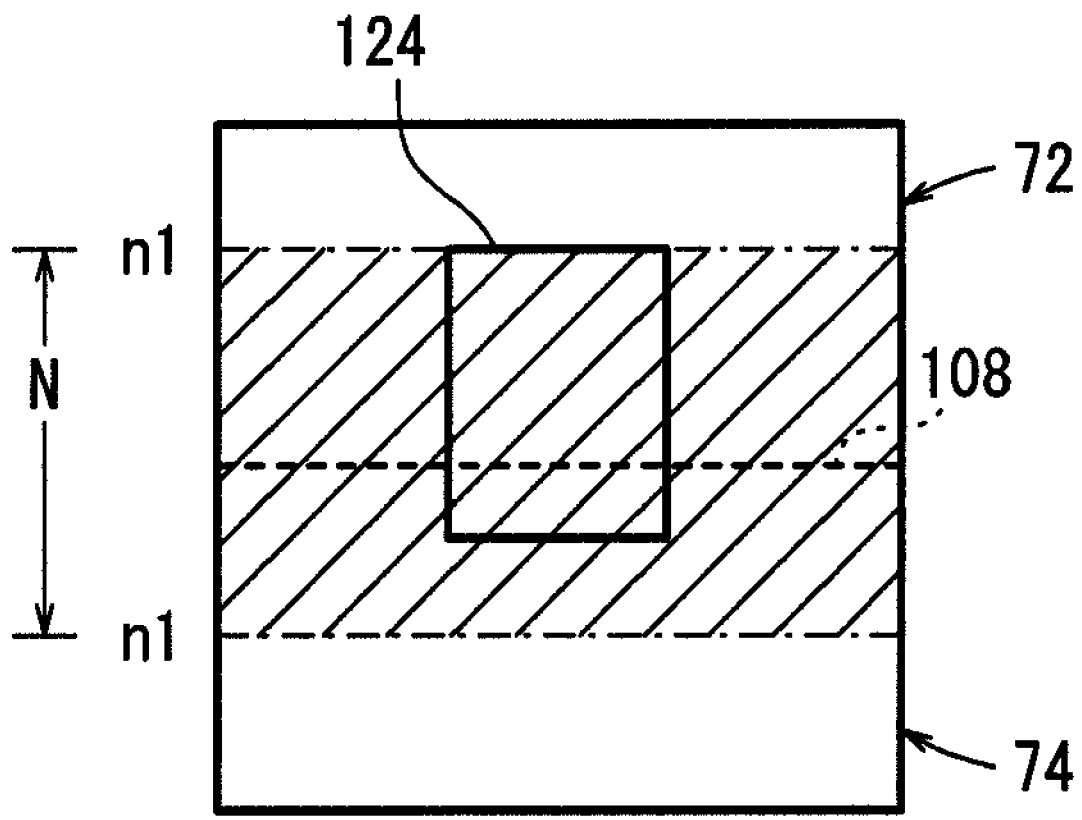
FIG. 8 is a view showing a range for reading radiation image information from the radiation conversion panel.

Specifically, the position of the collimator 56 of the image capturing unit 42 is adjusted to establish a radiation applied range 124 in which the radiation X is applied to the subject 40, as shown in FIG. 7. When the radiation applied range 124 is thus established, radiation image information is recorded in only the radiation applied range 124 of the radiation conversion panels 72, 74. In the radiation applied range 124 in the detecting areas A, B of the radiation conversion panels 72, 74, the position of the gate line 104 which is most spaced from the joint line 108 is represented by a maximum address signal to be set in the address decoder 112 for the radiation conversion panels 72, 74. For example, in FIG. 7, if the positions of the gate lines 104 in the radiation applied range 124 in the detecting areas A, B which are most spaced from the joint line 108 are indicated by n1, n2, respectively, then the maximum address signal is set to n1 (n1>n2). By thus setting the address signal, the stored radiation image information is read only from a range shown hatched in FIG. 8 of the radiation conversion panels 72, 74. An image signal representative of the radiation image information thus read is converted into an amplitude/phase-modulated signal, which is efficiently transmitted to the controller 44.

Figure 9:
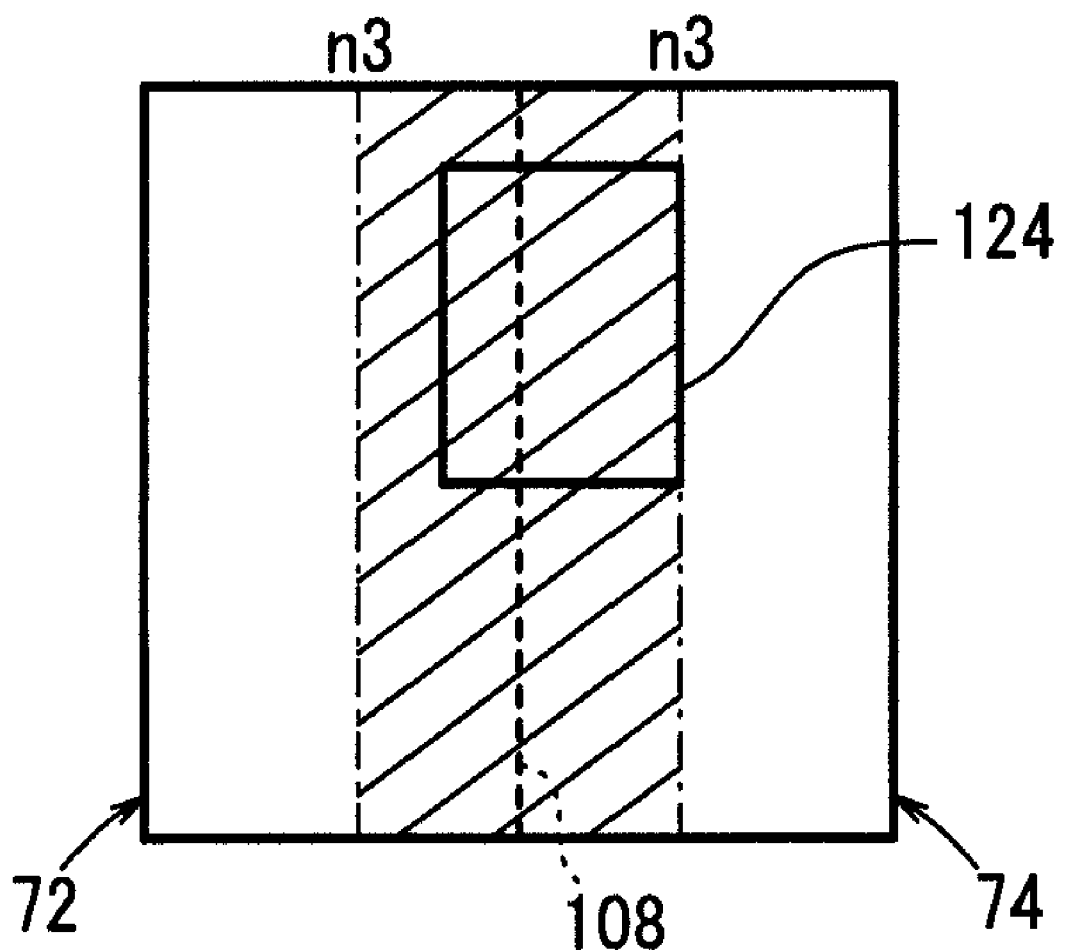
FIG. 9 is a view showing a range for reading radiation image information from the radiation conversion panel.

If the radiation applied range 124 is of an elongate rectangular shape having a width M parallel to the joint line 108 and a width N perpendicular to the joint line 108 (N>M), then the radiation conversion panels 72, 74 (the radiation detector 54) are turned 90 degrees in the direction indicated by the arrow θ, setting the maximum address signal for the gate line 104 to n3 (see FIG. 9) (n1>n3) corresponding to the width M of the radiation applied range 124. Therefore, radiation image information can be read only from a smaller range shown hatched in FIG. 9, and transmitted to the controller 44.

Figure 10:
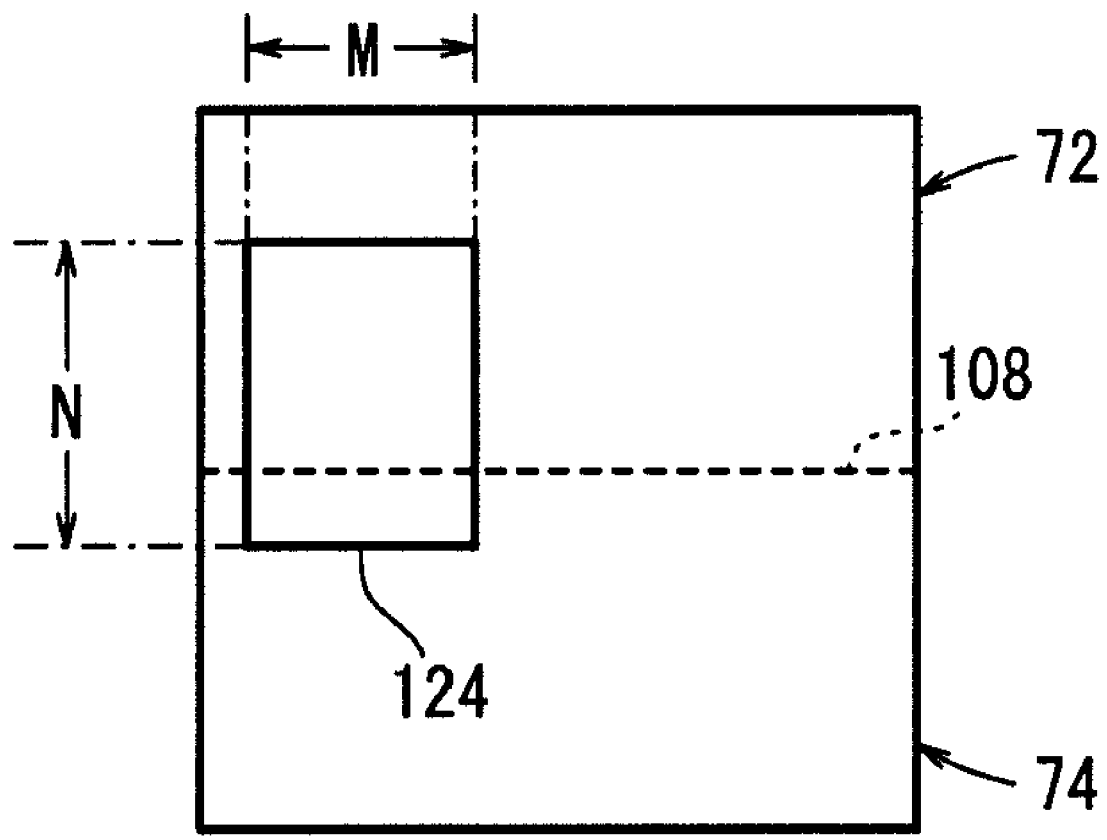
FIG. 10 is a view showing the relationship between the radiation conversion panel and a radiation applied range.
Figure 11:
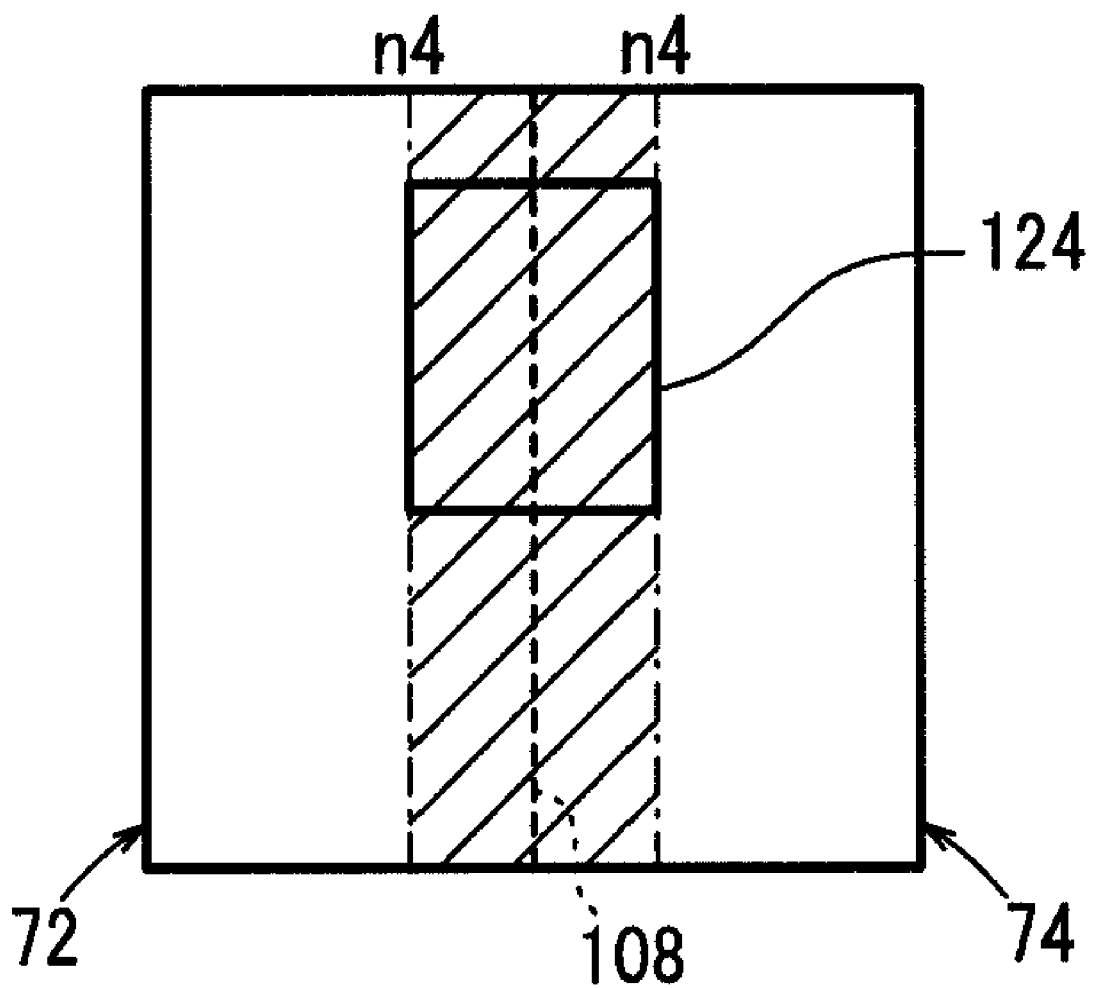
FIG. 11 is a view showing a range for reading radiation image information from the radiation conversion panel.

If the radiation applied range 124 is set in a displaced position on the radiation conversion panels 72, 74, as shown in FIG. 10, then the radiation conversion panels 72, 74 are turned a given angle in the direction indicated by the arrow θ and displaced given distances in the directions indicated by the arrows X, Y, as shown in FIG. 2, setting the maximum address signal for the gate line 104 to n4 (see FIG. 11) such that the gate lines 104 in the radiation applied range 124 which are most spaced from the joint line 108 are positionally minimized. As a consequence, radiation image information can be read only from a required minimum range shown hatched in FIG. 11 which corresponds to the radiation applied range 124.

Figure 12:
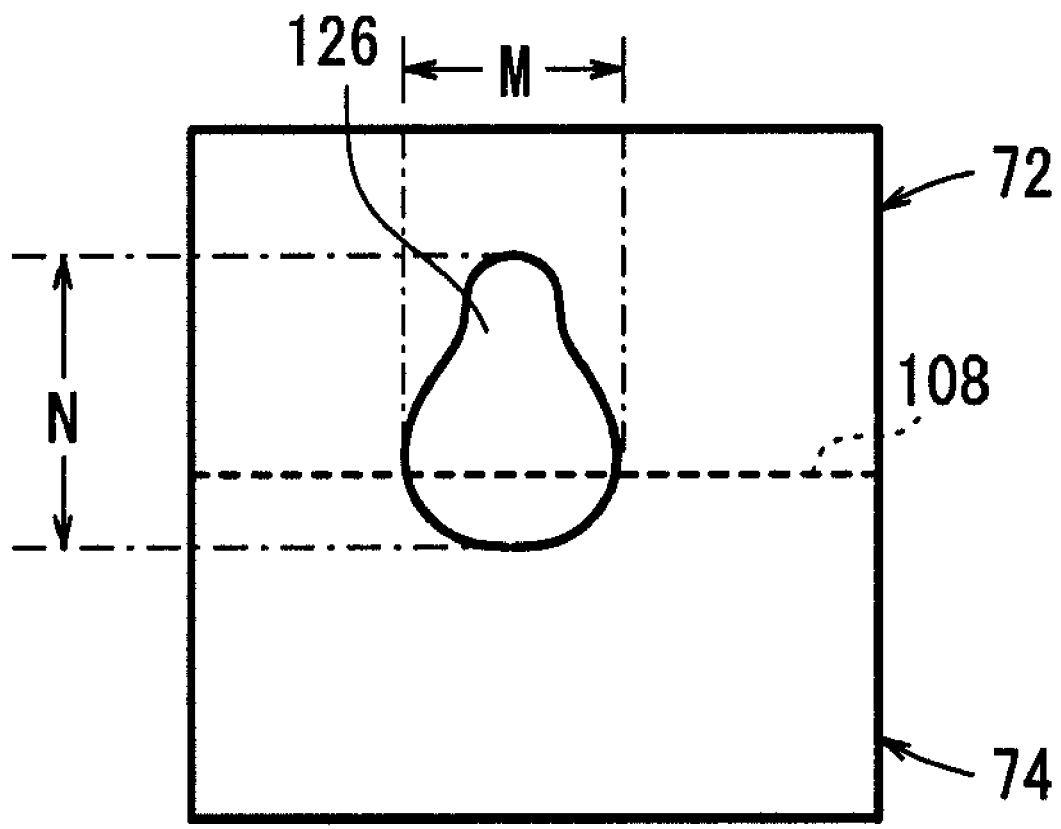
FIG. 12 is a view showing the relationship between the radiation conversion panel and a region of interest of a subject.
Figure 13:
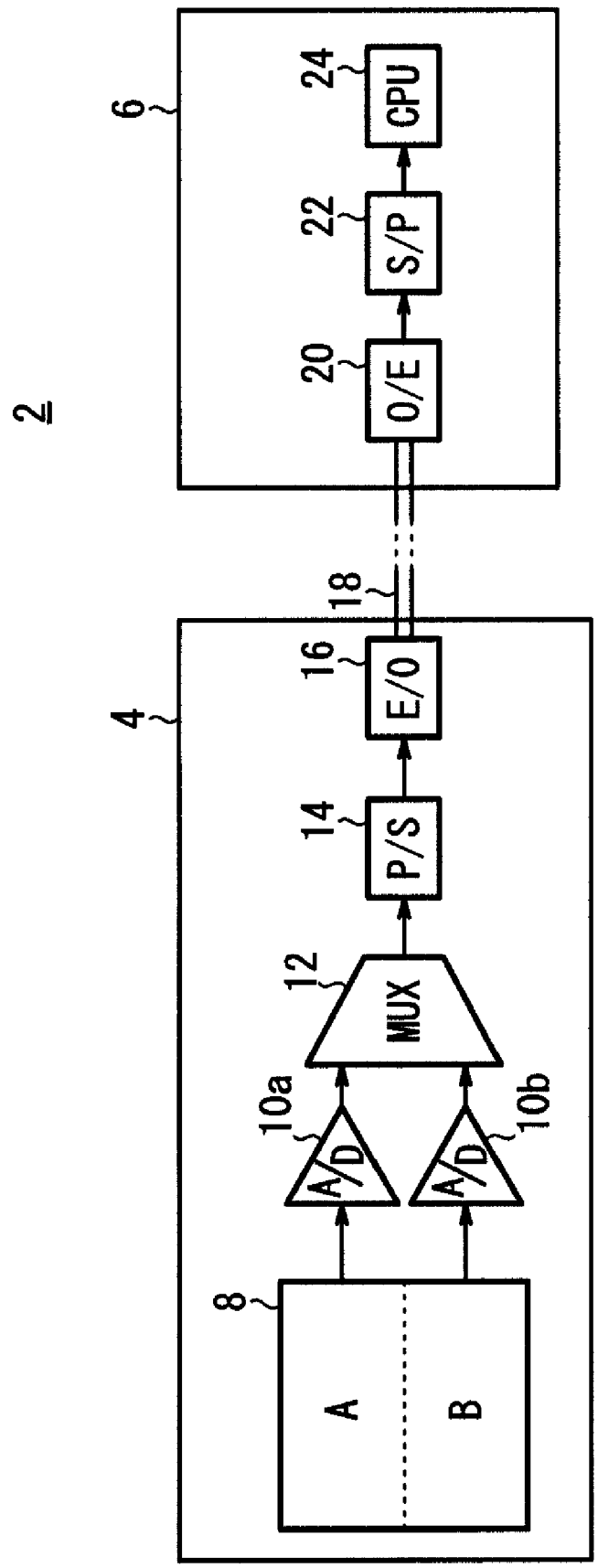
FIG. 13 is a block diagram of a radiation image capturing apparatus according to the related art.
Figure 14:
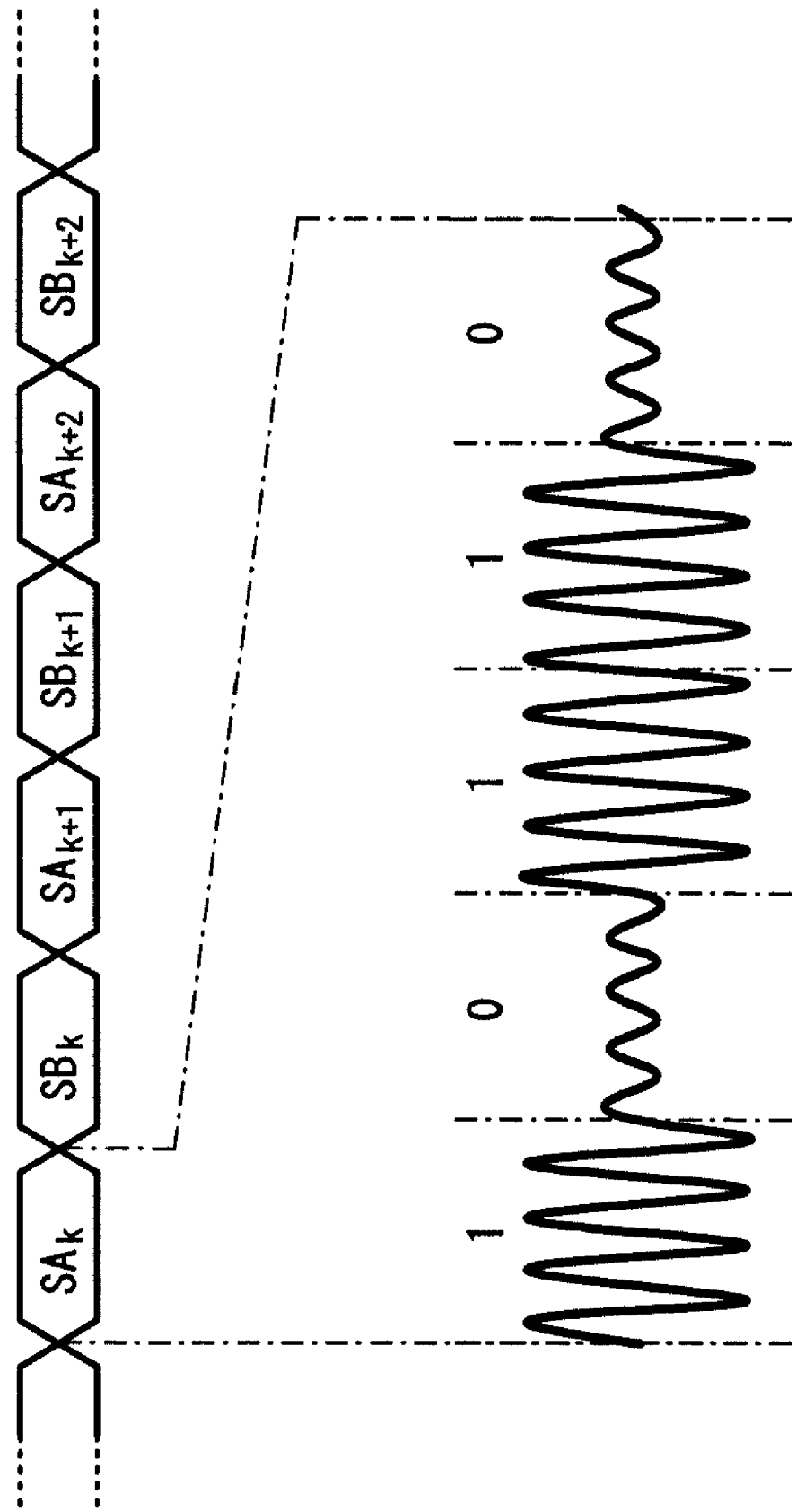
FIG. 14 is a diagram showing the relationship between a serial signal and an optical signal transmitted in the radiation image capturing apparatus shown in FIG. 13.

Furthermore, as shown in FIG. 12, the radiological technician may establish a region 126 of interest of the subject 40 to be recorded by the radiation detector 54, using the input unit 68, or may specify the region 126 of interest of the subject 40 by roughly reading the radiation image information of the subject 40, and set a maximum address signal in the address decoder 112 in the same manner as shown in FIGS. 7 through 11 based on the specified region 126 of interest for reading the radiation image information from the region 126 of interest.

The amplitude/phase-modulated signal is not limited to being transmitted between the radiation detector 54 and the console 64, but may be transmitted between the radiation detector 54 and another apparatus through the in-house network 32.

Although certain preferred embodiments of the present invention have been shown and described in detail, it should be understood that various changes and modifications may be made therein without departing from the scope of the appended claims.

What is claimed is:

1. A radiation image capturing apparatus comprising:
    a radiation detector including a two-dimensional matrix of radiation detecting elements;
    a radiation source for applying a radiation through a subject to said radiation detector to capture radiation image information of the subject in said radiation detector, said radiation image information detected by said radiation detector being divided into two sets of radiation image information; and
    an amplitude/phase modulator for modulating one of said two sets of radiation image information into an amplitude-modulated signal and modulating a phase of said amplitude-modulated signal according to the other of said two sets of radiation image information, for thereby generating an amplitude/phase-modulated signal to be transmitted as representing the radiation image information.

2. A radiation image capturing apparatus according to claim 1, further comprising a demodulator for demodulating the amplitude/phase-modulated signal transmitted from said amplitude/phase modulator to reproduce said two sets of radiation image information.

3. A radiation image capturing apparatus according to claim 1, wherein said radiation detector comprises two detection panels for detecting the radiation image information, and said amplitude/phase modulator modulates the radiation image information detected by one of said detection panels into said amplitude-modulated signal, and modulates the phase of said amplitude-modulated signal according to the radiation image information detected by the other of said detection panels, for thereby generating said amplitude/phase-modulated signal.

4. A radiation image capturing apparatus according to claim 3, further comprising
a generating range setting unit for setting a generating range for generating said amplitude/phase-modulated signal therefrom, said generating range being symmetrical with respect to a joint line between said detection panels.

5. A radiation image capturing apparatus according to claim 4, further comprising:
an adjuster for adjusting a position and/or posture of said radiation detector to render said generating range symmetrical with respect to said joint line.

6. A radiation image capturing apparatus according to claim 4, wherein said generating range is set based on a range in which said radiation is applied to said subject.

7. A radiation image capturing apparatus according to claim 4, wherein said generating range is set based on a region of interest of said subject.

8. A radiation image capturing apparatus according to claim 1, wherein said amplitude/phase-modulated signal is transmitted through an optical fiber.

9. A radiation image capturing apparatus according to claim 1, wherein amplitude representatives of one of the two sets of radiation image information in the amplitude/phase modulated signal are a high amplitude and a low amplitude and phase representatives of the other of the two sets of radiation image information in the amplitude/phase modulated signal are a first phase and a second phase.

10. A method of processing radiation image information in a radiation image capturing apparatus, said radiation image capturing apparatus capturing a radiation image by applying a radiation through a subject to a radiation detector including a two-dimensional matrix of radiation detecting elements, said method comprising the steps of:
dividing said radiation image information detected by said radiation detector into two sets of radiation image information;
modulating one of said two sets of radiation image information into an amplitude-modulated signal and modulating a phase of said amplitude-modulated signal according to the other of said two sets of radiation image information, for thereby generating an amplitude/phase-modulated signal; and
transmitting said amplitude/phase-modulated signal as representing the radiation image information.

11. A method according to claim 10, further comprising the step of
demodulating the transmitted amplitude/phase-modulated signal to reproduce said two sets of radiation image information.

12. A method according to claim 10, further comprising the step of
setting a generating range for generating said amplitude/phase-modulated signal therefrom, said generating range being symmetrical with respect to a joint line between two detection panels of said radiation detector.

13. A method according to claim 12, further comprising the step of
adjusting a position and/or posture of said radiation detector to render said generating range symmetrical with respect to said joint line.

14. A method according to claim 12, wherein said generating range is set based on a range in which said radiation is applied to said subject.

15. A method according to claim 12, wherein said generating range is set based on a region of interest of said subject.

* * * * *